(12) United States Patent
Uyeno et al.

(10) Patent No.: US 9,477,135 B1
(45) Date of Patent: Oct. 25, 2016

(54) NON-MECHANICALLY STEERED HIGH-POWER LASER TRANSMITTER

(71) Applicant: Raytheon Company, Waltham, MA (US)

(72) Inventors: Gerald P. Uyeno, Tucson, AZ (US); Sean D. Keller, Tucson, AZ (US); Irl W. Smith, Concord, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/811,361

(22) Filed: Jul. 28, 2015

(51) Int. Cl.
| | | |
|---|---|---|
| *G02B 26/08* | (2006.01) |
| *G02F 1/29* | (2006.01) |
| *G02F 1/295* | (2006.01) |
| *G02F 1/13* | (2006.01) |
| *G02B 5/30* | (2006.01) |
| *H01S 3/00* | (2006.01) |

(52) U.S. Cl.
CPC ............. *G02F 1/292* (2013.01); *G02B 5/3025* (2013.01); *G02F 1/1326* (2013.01); *G02F 1/295* (2013.01); *H01S 3/0071* (2013.01)

(58) Field of Classification Search
CPC ..... G02B 5/3025; G02F 1/292; G02F 1/295; G02F 1/1326; H01S 3/0071
USPC ........ 359/303, 301, 298, 237, 571–573, 333
See application file for complete search history.

(56) References Cited

U.S. PATENT DOCUMENTS

| | | | | |
|---|---|---|---|---|
| 7,215,472 B2 * | 5/2007 | Smith | ..................... | G02F 1/292 359/568 |
| 8,380,025 B2 | 2/2013 | Anderson et al. | | |
| 8,463,080 B1 | 6/2013 | Anderson et al. | | |
| 2005/0265403 A1 * | 12/2005 | Anderson | ............... | H01S 5/143 372/20 |

FOREIGN PATENT DOCUMENTS

WO    2014200581 A2    12/2014

OTHER PUBLICATIONS

Ayral et al., "Phase-conjugate Nd:YAG laser with internal acousto-optic beam steering," Aug. 15, 1991, vol. 16, No. 16, Optics Letters, pp. 1225-1227.
Chiu et al., "Shape-Optimized Electrooptic Beam Scanners: Analysis, Design, and Simulation," Journal of Light wave Technology, vol. 17, No. 1, Jan. 1999, pp. 108-114.
Kim et al., "Wide-angle, nonmechanical beam steering using thin liquid crystal polarization gratings," Proc. of SPIE, vol. 7093, 2008.

* cited by examiner

*Primary Examiner* — Tuyen Tra
(74) *Attorney, Agent, or Firm* — Eric A. Gifford (57) ABSTRACT

A steerable laser transmitter uses a two-stage architecture for beam steering. A LCWG is used to provide continuous fine steering and a PG stack is used to provide discrete coarse steering. An optical amplifier is inserted between the LCWG and the PG stack to provide gain and increase transmitter power, hence range. The LCWG is configured to limit its steering range to the acceptance angle of the optical amplifier, at most ±2°×±2°. The result is a high-power laser transmitter that can be rapidly and precisely steered over a large FOR.

20 Claims, 7 Drawing Sheets

| NET FOR | PG'S USED |
|---|---|
| 0.5 | 0.5 |
| 1 | 1 |
| 1.5 | 1+0.5 |
| 2 | 2 |
| 2.5 | 2+0.5 |
| 3 | 2+1 |
| 3.5 | 2+1+0.5 |
| 4 | 4 |
| 4.5 | 4+0.5 |
| 5 | 4+1 |
| 5.5 | 4+1+0.5 |
| 6 | 4+2 |
| 6.5 | 4+2+0.5 |
| 7 | 4+2+1 |
| 7.5 | 4+2+1+0.5 |

| NET FOR | PG'S USED |
|---|---|
| 2 | 2 |
| 4 | 4 |
| 6 | 4+2 |
| 8 | 8 |
| 10 | 8+2 |
| 12 | 16-4 |
| 14 | 16-2 |
| 16 | 16 |
| 18 | 16+2 |
| 20 | 16+4 |
| 22 | 16+4+2 |
| 24 | 16+8 |
| 26 | 16+8+2 |
| 28 | 16+8+4 |
| 30 | 16+8+4+2 |

FIG.6b

NON-MECHANICALLY STEERED HIGH-POWER LASER TRANSMITTER

BACKGROUND OF THE INVENTION

1. Field of the Invention

This invention relates to laser transmitters, and more particularly to providing small, high-power laser transmitters that rapidly steer and point over a large field-of-regard (FOR).

2. Description of the Related Art

Laser transmitters traditionally used mechanically controlled mirrors, prisms, or refractive devices to aim, steer and scan laser beams over a FOR. Such mechanically controlled systems have disadvantages in size, weight, power consumption and cost ("SWaP-C") as well as failure rate and steering limitations.

A non-mechanical approach for beam steering is desirable since it is likely to be smaller, lighter, lower power and less expensive, better SWaP-C, as well as faster, more accurate, more reliable and provide more flexible steering. The challenge is to find a non-mechanical approach that maintains the FOR and range achieved by mechanically steered laser transmitters.

J. L. Ayral et. al. "Phase-conjugate Nd:YAG laser with internal acousto-optic beam steering" OPTICS LETTERS, Vol. 16, No. 16, pp. 1225-1227 Aug. 15, 1991 discloses a Nd:YAG oscillator that delivers a near-diffraction-limited beam that intercepts an acousto-optic deflector. The deflected beam is amplified in a high-gain Nd:YAG zigzag slab amplifier, reflected by an SBS phase-conjugate mirror and amplified again on the second pass. The deflected beam is extracted by reflection on a polarizing beam splitter, after 90° polarization rotation obtained by the double pass through a quarter-wave plate. The main features of this laser source are the following: First, the acoustic-optic deflector is placed on the low-energy beam and consequently does not suffer from any optical damage. Second, owing to the intrinsic properties of phase conjugation, the output beam direction is identical in magnitude to the one imposed by the deflector, independent of any internal reflection that occurs in the laser amplifier. Moreover, thermally induced phase distortions due to the double-pass amplifier are corrected. Third, the laser source is self-aligned.

Jihwan Kim et. al. "Wide-angle, nonmechanical beam steering using thin liquid crystal polarization gratings" Proc. Of SPIE Vol. 7093, 2008 discloses a two-stage technique of beam steering. A fine steering module is constructed of two Optical Phased Arrays (OPAs) designed to cover a ±3.125° range in both the horizontal and vertical directions and expands the steered beam by a factor of 2.5. A subsequent coarse-steering module is based on Liquid Crystal Polarization Grating (LCPGs) that exhibit wide-angle deflection, high overall transmittance, and a very thin package, which thus avoids problems with beam walkoff (loss of clear aperture arising from transverse shifts of the beam within the optical train). The fine and coarse steering modules provide continuous steering over a full 80°×80° FOR.

WO 2014/200581 "Non-Mechanical Beam Steering Tracking System" published Dec. 18, 2014 discloses one or more polarization gratings (PG) coupled to one or more Steerable Electro-Evanescent Optical Refractors (SEEOR) to provide the coarse steering advantage of the PG over a wide and also the continuous fine steering advantage of the SEEOR. Each SEEOR refractor does an excellent job of fine beam control within a narrower FOR (as much as 60°×15°). Vescent Photonics demonstrated a 50°×15° SEEOR. 6 PGs and a single SEEOR can be combined to provide precise fine pointing and a wide (120°×120° or more) FOR. This approach greatly reduces the total number of devices required, when compared to using either technology individually to cover the same FOR. Embodiments of a SEEOR are described in U.S. Pat. Nos. 8,463,080 and 8,311,372. Embodiments of a stack of PGs are described in J. Kim, C. Oh, M. J. Escuti, L. Hosting, and S. A. Serati, "Wide-angle, nonmechanical beam steering using thin liquid crystal polarization gratings," Advanced Wavefront Control: Methods, Devices, and Applications VI (SPIE, 2008). The terms SEEOR and LCWG are used synonymously in this invention.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a non-mechanically steered high-power, wide FOR laser transmitter capable of continuous fine steering and pointing.

This is accomplished by placing an optical amplifier between a liquid crystal waveguide (LCWG) that provides continuous fine steering and a PG stack that provides discrete coarse steering. The two-dimensional steering range of the LCWG is limited to the acceptance angle of the optical amplifier ($<=\pm2°\times\pm2°$) over which the amplifier provides approximately uniform gain. The number of PGs in the stack is selected to cover a wide FOR, at least 10°×10°, preferably at least 30°×30° and greater than 120°×120° in each axis.

In an embodiment, the LCWG is configured for small angle steering and maximum power throughput. This configuration couples in a large diameter beam to the LCWG, which decreases the energy density inside the LCWG. The large diameter beam requires a larger aperture electrode that decreases the total steering range and matches the acceptance angle of the optical amplifier.

In an embodiment, a non-mechanically steerable laser transmitter comprises a laser configured to produce a linearly polarized spot-beam, a liquid crystal waveguide (LCWG) responsive to command signals to continuously steer the linearly polarized spot-beam over a fine two-dimensional angular range of no greater than $\pm2°\times\pm2°$ and an optical amplifier that provides substantially uniform gain over the fine angular range (determined by the amplifier's acceptance angle). A fixed quarter waveplate (QWP) positioned at the output of the amplifier converts the linearly polarized spot-beam to a circularly polarized spot-beam. A switchable polarization grating stack provides discrete steering over a coarse angular range (greater than the amplifier's acceptance angle). The stack comprises a plurality of polarization gratings (PGs), each PG comprising an electrically controlled half waveplate (HWP) and a PG (passive or active). Application of voltage to the HWP turns the circular polarization of the spot-beam into either right-hand or left-hand polarization. The PG deflects the different handedness into different exit angles. By controllably selecting the handedness one may controllably select the angular deflection.

In an embodiment, the amplifier comprises a crystal that is doped to amplify the optical beam when illuminated with appropriate optical-pumping radiation and tapered to match the fine two-dimensional angular range of the LCWG. The crystal has a conical shape with the entrance face perpendicular to the optical axis. The crystal is suitably pumped in a zig-zag approach from the exit face inwards. The exit face is chamfered to allow pump light propagation through the amplifier without the structure of the pump lasers interfering with the steered laser beam. The amount of taper from the entrance to the exit face defines the acceptance angle of the amplifier. If the acceptance angle is too large, $>\pm 2° \times \pm 2°$, the uniformity of optical gain and the efficiency of the amplifier will degrade. In an embodiment, the amplifier provides an optical gain of at least 10 dB with a uniformity of better than 3 dB and an efficiency of at least 0.5% over its acceptance angle. Additionally, the amplifier surface is coated (or clad) to reduce the effects of amplified spontaneous emission (ASE) while confining the pump beam inside the amplifier. The rotational symmetry of the conically shaped amplifier reduces the effects of corner stresses when mounting the amplifier. Minimizing the depolarization helps maintain the overall transmitter efficiency. In this amplifier the gain is proportional to the length of the amplifier, which does not have a zig-zag propagation pattern.

In one embodiment, the exit face of the crystal is tilted with respect to the entrance face to provide anamorphic compression to the elliptical portion of the in-plane beam to make the exit beam circular again. The PG stack is tilted to match the tilt of the exit face. In another embodiment, the exit face is parallel to the entrance face and the exit beam is elliptical. The elliptical shape beam provides higher spatial resolution in-plane than the circular beam.

In an embodiment, the laser is configured to produce a linearly polarized spot-beam at a wavelength of 1.55 microns. The amplifier is Erbium (Er) doped to provide optical amplification of the 1.55 micron beam. Er:YAG, Er:Glass or similar amplifier configurations may be used. The amplifier provides at least 10 dB optical gain with uniformity better than 3 dB and an efficiency of at least 0.5% over the acceptance angle of the amplifier.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6a and 6b are diagrams of the PG stack for steering over different FOR.

DETAILED DESCRIPTION OF THE INVENTION

The two-stage approach, comprising an LCWG for continuous fine tuning over a 30°×8° or 50°×15° angular range and a PG stack for discrete coarse tuning over an angular range of 120°×120° or more (WO 2014/200581) provides a laser transmitter that can be rapidly steered over a large FOR. However, this transmitter cannot transmit at the long ranges required by some applications due to the power limitation of the LCWG.

Insertion of an optical amplifier into the signal path may provide the requisite gain. The amplifier cannot be placed in front of the LCWG, which is already operating at its maximum power capability. Optical amplifiers provide uniform gain over a narrow acceptance angle (at most $\pm 2° \times \pm 2°$). As presently configured, the amplifier cannot be inserted down stream of the LCWG. The steering range is given as 30°×8° or 50°×15°), which is much larger than acceptance angle of the amplifier.

One option is to use Ayral's Phase-conjugate Nd:YAG laser with internal acousto-optic modulator for one-dimensional beam steering. However, this approach has a relatively small FOR ($<\pm 1.5° \times \pm 1.5°$), slow steering (5 micro second random access), uses high voltage and high capacitance due to the device thickness, and can only produce 200 resolved spots.

Our solution is to place an optical amplifier between the LCWG and the PG stack and reconfigure the LCWG to limit its steering range to the acceptance angle of the amplifier (at most $\pm 2° \times \pm 2°$). The amplifier should provide at least 10 dB gain with at most a 3 dB variation over the acceptance angle with an electrical to optical efficiency of at least 0.5%. This performance is unobtainable over wide steering ranges. We can achieve higher steering precision and greater speed e.g., at least 1° per micro second by limiting the steering range of the LCWG. To achieve the equivalent FOR, the number of polarization gratings in the stack must be increased, which increases cost (gratings and drive electronics). The laser transmitter power is increased by the gain. The range is increased by at least the square root of the gain with an extended target but changes with different target geometries. The number of resolved spots in this configuration is at least 200 spots in each of two dimensions for a 10°×10° transmitter FOR.

In an embodiment, the laser is configured to produce a linearly polarized spot-beam at a wavelength of 1.55 microns. The amplifier is Erbium (Er) doped to provide optical amplification of the 1.55 micron beam. Er:YAG, Er:Glass or similar amplifier configurations may be used. For different wavelengths, the LCWG can be formed of different materials to steer the appropriate band and the amplifier can be doped with different dopants to provide gain.

Figure 1A:
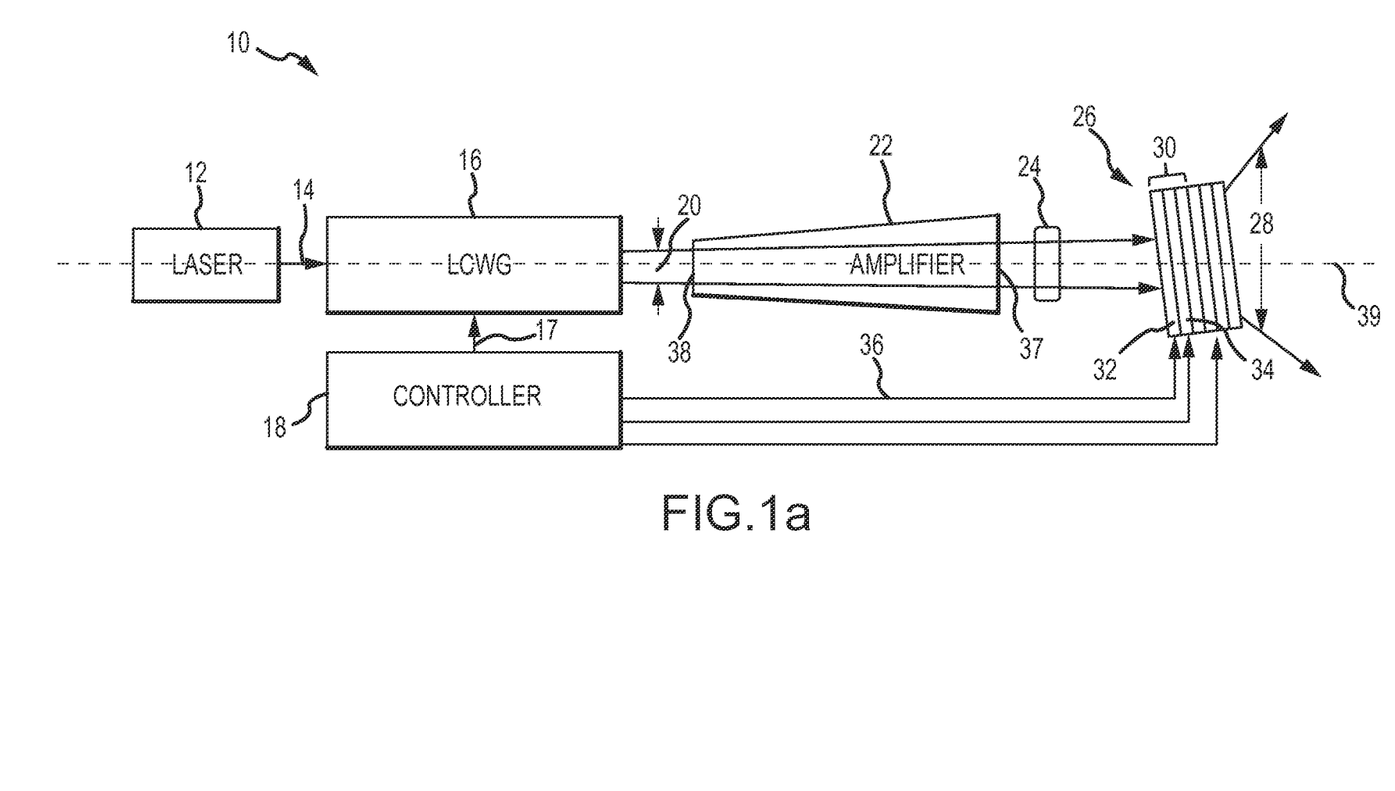
FIGS. 1a and 1b are top and side views of an embodiment of a non-mechanically steered high-power laser transmitter.
Figure 1B:
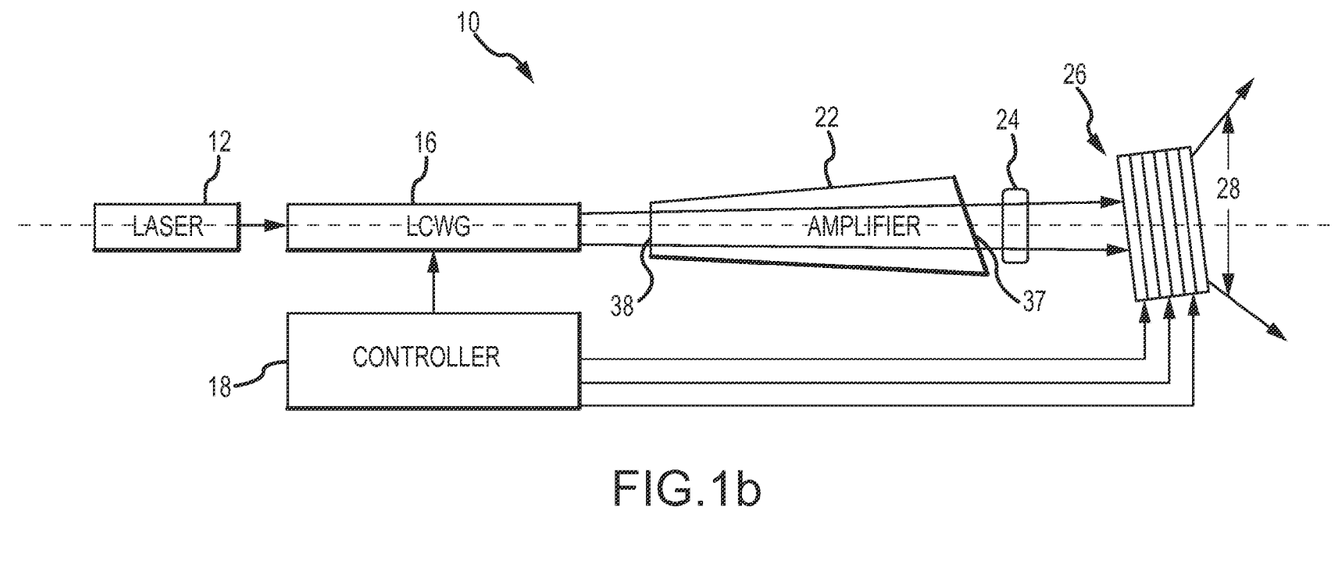

Referring now to FIGS. 1a-1b, a steerable laser transmitter 10 comprises a laser 12 configured to produce a linearly polarized spot-beam 14, a liquid crystal waveguide (LCWG) 16 responsive to command signals 17 issued by a controller 18 to continuously steer the linearly polarized spot-beam over a fine two-dimensional angular range 20 of no greater than $\pm 2° \times \pm 2°$ and an optical amplifier 22 that provides substantially uniform gain over the angular range 20 (determined by the amplifier's acceptance angle). A fixed quarter waveplate (QWP) 24, suitably positioned at the output of the amplifier, converts the linear polarization of spot-beam 14 to a circular polarization. The QWP is suitably zero-order to reduce angular dependence and provide uniform retardance over the narrow steering range of the LCWG. A switchable polarization grating stack 26 provides discrete steering over a coarse angular range 28 (greater than the amplifier's acceptance angle). The stack 28 comprises a plurality of polarization gratings (PGs) 30, each comprising an electrically controlled half waveplate (HWP) 32 and a grating 34 (passive or active). Application of voltage 36 to the electrically controlled HWP 32 turns the circular polarization of spot-beam 13 into either right-hand or left-hand polarization. The PG 30 deflects the different handedness into different exit angles. By controllably selecting the handedness one may controllably select the angular deflection.

In the depicted embodiment, an exit face 37 of the crystal is tilted with respect to an entrance face 38, which is perpendicular to the optical axis 39, to provide anamorphic compression to the elliptical portion of the in-plane beam to make the exit beam circular again. The PG stack 28 is tilted to match the tilt of the exit face. In another embodiment, the exit face is parallel to the entrance face and the exit beam is elliptical. The elliptical shape beam provides higher spatial resolution in-plane than the circular beam.

In certain systems, it may be useful for the output beam to have a fixed polarization. This requires a final HWP. In addition, it is usually desirable to have the output beam be linearly polarized. This requires adding a final fixed, and in this case zero-order, QWP.

Figure 2:
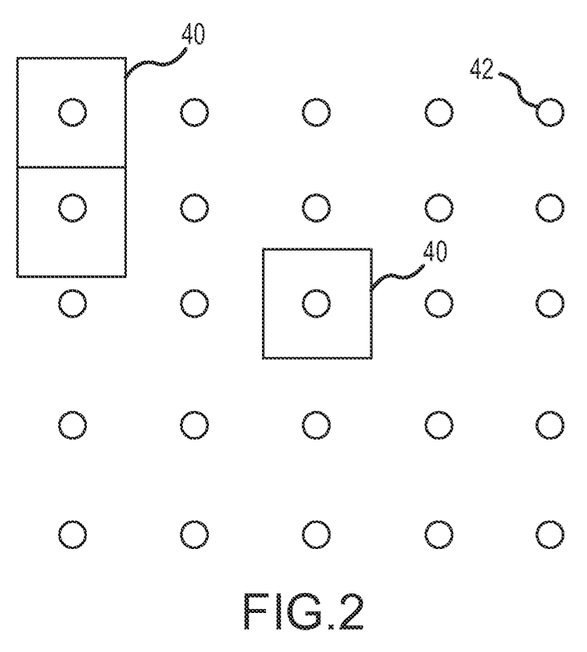
FIG. 2 is a diagram illustrating the discrete coarse steering of a polarization grating (PG) stack and the continuous fine steering of a liquid crystal waveguide (LCWG)

Referring now to FIG. 2, box 40 represents the steering of the spot-beam by the LCWG over the fine two-dimensional angular range (<=±2°×±2°). Each dot 42 represents the centroid of discrete coarse steering by the PG stack. The spacing of the dots is set by the first PG in the stack and is equal to the fine angular range of the LCWG. The collection of dots defines the coarse angular range. The total FOR is defined by the combination of the PG stack and LCWG.

U.S. Pat. No. 8,380,025 entitled "Liquid Crystal Waveguide Having Refractive Shapes for Dynamically Controlling Light" assigned to Vescent Photonics, Inc., which is hereby incorporated by reference, discloses a LCWG that can be customized to provide rapid steering over a narrow angular range of no greater than ±2°×±2°. The patent discloses a LCWG that is configurable to form and scan a laser spot over a FOR to provide a relative illumination for active sensors. A time varying voltage is applied to the LCWG to modulate the liquid crystal material in order to form and position the laser spot according to the specified scan pattern. Liquid crystal waveguides dynamically control the refraction of light. Generally, liquid crystal materials may be disposed within a waveguide in a cladding proximate or adjacent to a core layer of the waveguide. In one example, effective refractive-index properties of portions of the liquid crystal material can be modulated to form refractive optical component shapes (e.g. planar lenses or planar prisms) in the cladding that interact with a portion (specifically the evanescent field) of light in the waveguide so as to permit electronic control of the refraction/bending, focusing, or defocusing of light as it travels through the waveguide.

The shape of the prism components determines the amount of in-plane steering within the LCWG. The prism elements are arranged in a horn configuration where multiple smaller apex angle prisms deviate the laser beam successively where the start of the horn has smaller aperture, larger apex angle prisms and the end of the horn has larger aperture, smaller apex angle prisms. The number of prisms within the horn and apex angle of each prism determines the total LCWG steering angle at maximum deflection in the plane of the LCWG. The commercially available LCWG horn electrode configuration produces a 35°×8° FOR from a 1 mm diameter entrance beam. Another horn electrode configuration has a larger aperture at the start of the horn with fewer steering elements. This horn electrode configuration produces less steering with a FOR to match to acceptance angle of the amplifier. The larger horn electrode also decreases the energy density within the LCWG enabling higher power lasers than the standard LCWG. The higher energy throughput of the LCWG further increase the range of this transmitter by amplifying a higher power laser beam than the standard LCWG configuration. The construction of the LCWG core or cladding does not change.

Steering out of the plane of the LCWG is achieved using a rectangular electrode that modulates the effective index of refraction of the core in the region above the internal taper. This modulation changes the angle of light exiting the LCWG due to the internal taper and enables out of plane steering.

In one example, a waveguide may be formed using one or more patterned or shaped electrodes that induce formation of such refractive shapes of liquid crystal material, or alternatively, an alignment layer may have one or more regions that define such refractive or lens shapes to induce formation of refractive or lens shapes of the liquid crystal material. The electrodes are positioned within the LCWG and orientated according to the shape of the LCWG core such that each electrode modulates the liquid crystal material for a different direction of steering. In another example, such refractive shapes of liquid crystal material may be formed by patterning or shaping a cladding to define a region or cavity to contain liquid crystal material in which the liquid crystal materials may interact with the evanescent light. The LCWG controller includes command and synchronization electronics that receive a start of frame/row from a ROIC and generate analog drive signals that specify the scan pattern and a drive controller that converts the analog drive signals to a high frequency, high voltage drive signal applied to the LCWG. These command and synchronization electronics may also synchronize the pulses from the laser source.

Figure 3A:
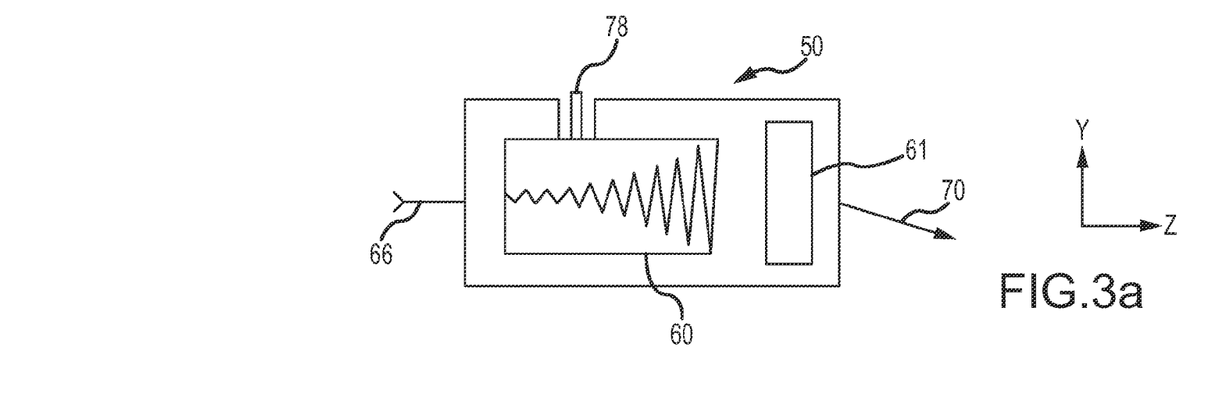
FIGS. 3a, 3b, 3c are top, front and side views of an embodiment of a Liquid Crystal Waveguide (LCWG) in which the electrodes are customized for steering over the acceptance angle of the optical amplifier.
Figure 3B:
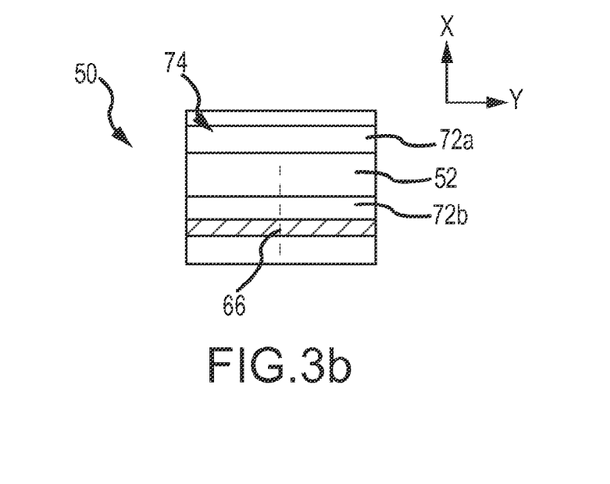
Figure 3C:
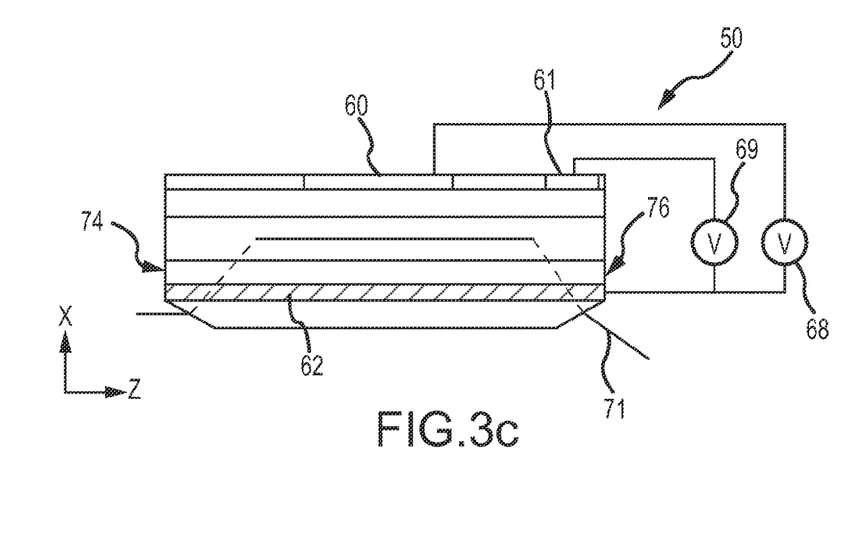

Referring now to FIGS. 3a, 3b and 3c, the waveguide 50 may be generally rectangular in shape and may include a core 52 having a generally rectangular cross-section or defining a parallelepiped between upper and lower claddings 72a and 72b. On the front end 74 of the waveguide 50, light 66 is introduced into the waveguide core 52 and propagates along the length of the waveguide 50 to the distal end 76 of the waveguide 50. The direction of propagation of light 66 through the waveguide 50 is generally along the length of the waveguide 50, and use of embodiments of the present invention permit the in-plane steering angle 70 and out-of-plane steering angle 71. The steering is altered depending, in part, on the shapes of the upper shaped in-plane electrode 60 (e.g. a horn electrode formed of prism elements) and upper out-of-plane electrode 61, and the voltages 68 and 69 applied between the electrodes 60 and 61 and the ground plane 62. Although the waveguide 50 is shown as generally rectangular, it is understood that a waveguide made according to one or more embodiments of the present invention could have other shapes such as square, trapezoid, parallelogram, any polygon, or even be diced or scribed so as to have rounded edges producing elliptical, circular, or any curved shape.

In one example, the shaped in-plane electrode 60 may induce a tab or extension therefrom 78 which permits the patterned electrode(s) to be electrically connected to other electrical elements, such as a voltage source 68 coupled between the shaped in-plane electrode 60 and the lower electrode or plane 62. Alternatively, electrical traces, conductors, vias or other conventional connection types may be utilized instead of or with tab 78 to electrically couple shaped in-plane electrode 60 to other electrical elements.

Figure 4:
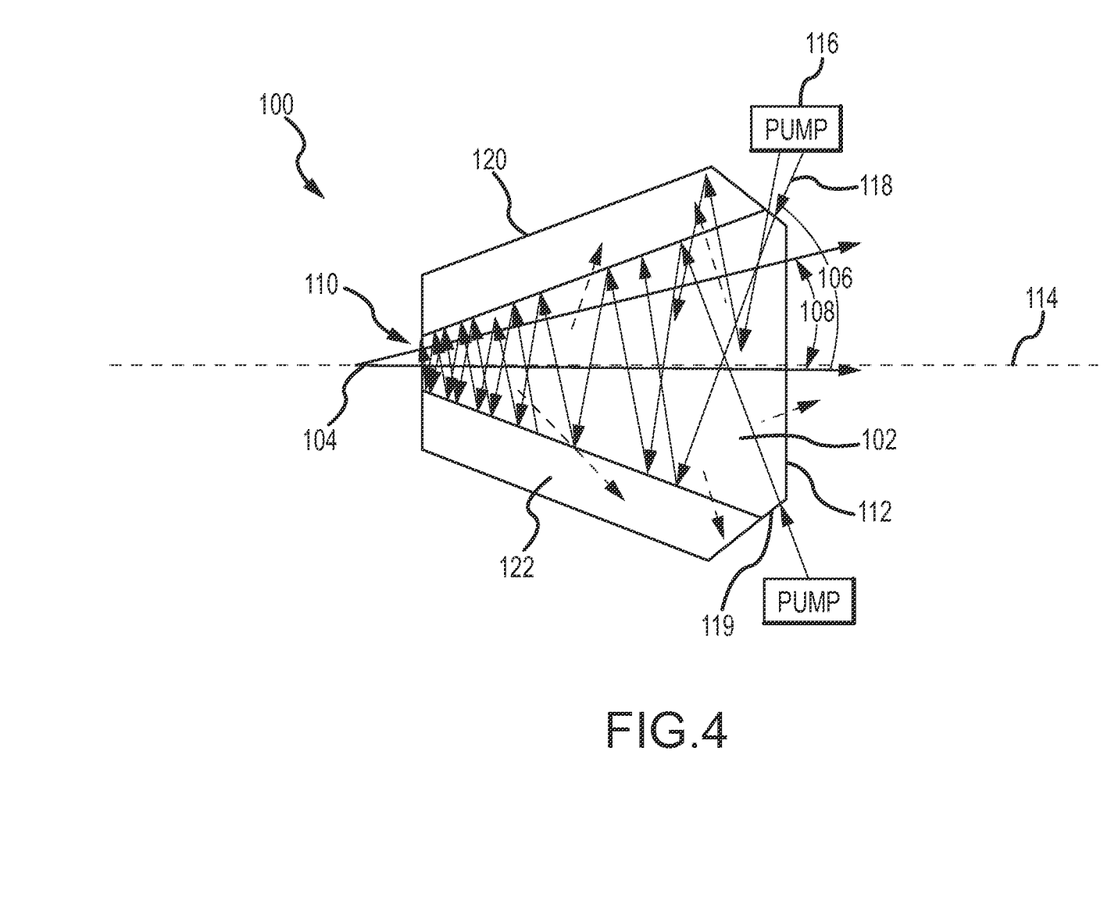
FIG. 4 is a diagram of an embodiment of an optical amplifier; 5

Referring now to FIG. 4, in an embodiment an optical amplifier 100 comprises a crystal 102 that is doped to amplify a laser beam 104 and tapered such that the amplifier's acceptance angle 106 approximately matches the fine two-dimensional angular range 108 of the LCWG. The crystal has a conical shape with both the entrance and larger exit faces 110 and 112, respectively, perpendicular to the optical axis 114. Alternately, exit face 112 could be tilted to provide anamorphic compression of the in-plane component of the beam to make the exit beam circular. One or more pump lasers 116 inject a pump beam 118 in a zig-zag approach from chamfered sections 119 of exit face 112 inwards. The entrance and exit faces are tapered to allow pump beam propagation through the amplifier without the structure of the pump lasers interfering with the steered laser beam 104. If the acceptance angle is too large, >±2°×±2°, the uniformity of optical gain and the efficiency of the amplifier will degrade. In an embodiment, the amplifier provides an optical gain of at least 10 dB with a uniformity of better than 3 dB and an efficiency of at least 0.5% over its acceptance angle.

Additionally, the amplifier surface is coated (or clad) 120 to reduce the effects of amplified spontaneous emission (ASE) 122 while confining the pump beam 118 inside the amplifier. The rotational symmetry of the conical amplifier reduces the effects of corner stresses when mounting the amplifier. Minimizing the depolarization helps maintain the overall transmitter efficiency. In this amplifier the gain is proportional to the length of the amplifier, which does not have a zig-zag propagation pattern.

Jihwan Kim et. al. section 3 "Single LCPG Steering Stage" and section 4 "Coarse Steerer Design Option" describes active and passive PG stages that can be cascaded to form a PG stack that provides discrete coarse steering over a wide FOR. A "stage" may comprise a switchable LC half waveplate and an active PG or a pair of switchable LC half waveplates and a pair of passive PGs. Liquid crystal polarization gratings can function as highly efficient beam steering elements, by deflecting all of the incident light into one of three diffraction orders. The incident laser beam must be circularly polarized.

Although it is known in the art that PGs operate in sine space, their contribution to the total angular FOR can be described to a first order using angles only. This invention does not claim any modifications to PGs and therefore doesn't need to precisely describe the PG according to their native sine space. Therefore two PGs of 8° and 6° deviation are referred to as having a 24° deviation, when the physical deviation is actually the sine of 8° plus the sine of 16°, or 24.5°.

In an active stage, when no voltage is applied, the LC half waveplate switches the handedness of the incident laser beam with a specific amplitude of external applied voltage. Without a specific amplitude of external applied voltage, it allows the incident laser beam to pass through without changing its polarization state. The LCPG diffracts RCP and LCP beams into the +1 and −1 orders respectively, with approximately 100% efficiency. The polarization sensitive diffraction of LCPGs can be used to select the steering direction into one of the first orders, by simply switching the LC half waveplate. The active LCPG can steer all of the incident laser beam into the zero-order under an applied voltage to provide three unique steering directions corresponding to the three diffraction orders.

Figure 5:
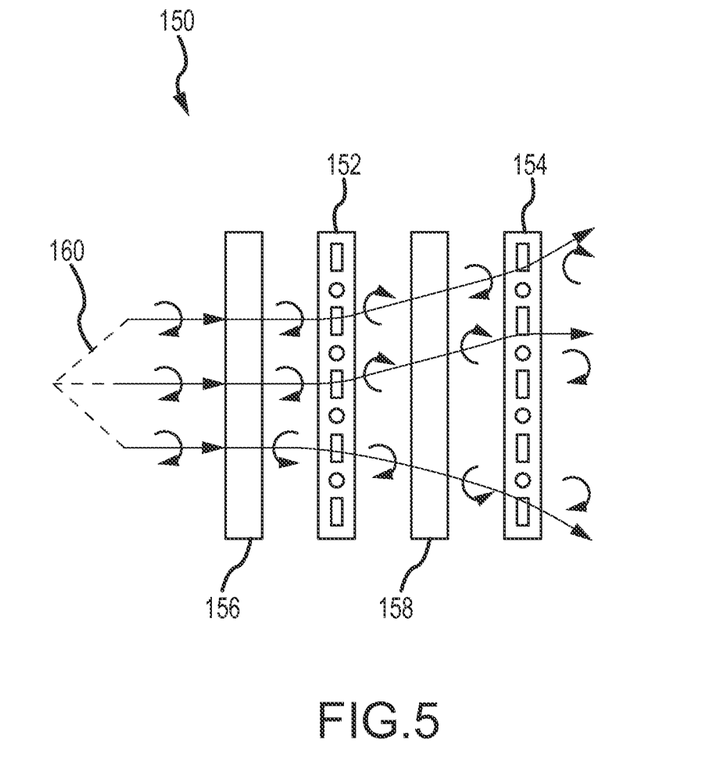
FIG. 5 is a diagram of an embodiment of a stack of polarization gratings (PGs)

Referring now to FIG. 5, a passive stage 150 includes two passive PGs 152, 154 and two variable LC half waveplates 156, 158 to essentially perform in the same manner as the active PG steering stage to steer the incident beam 160 to three different directions. The steering directions are determined by the voltage-states of the two LC half waveplates 156, 158, positioned in front of the two passive PGs. When both the waveplates are in the same state, the diffraction from the first PG is compensated by the second PG. When the waveplates are in opposite states, the incident laser beam can be diffracted into the positive or negative order.

Figure 6A:
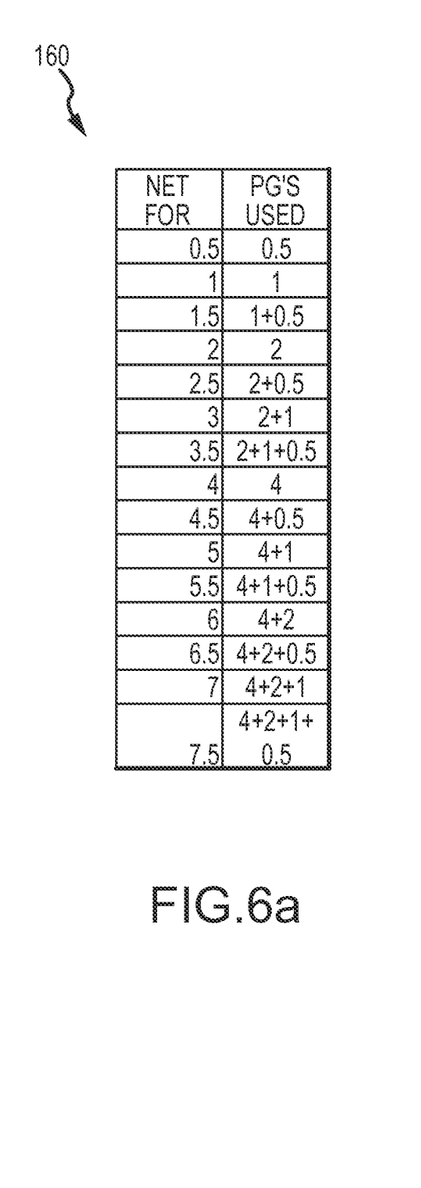
Figure 6B:
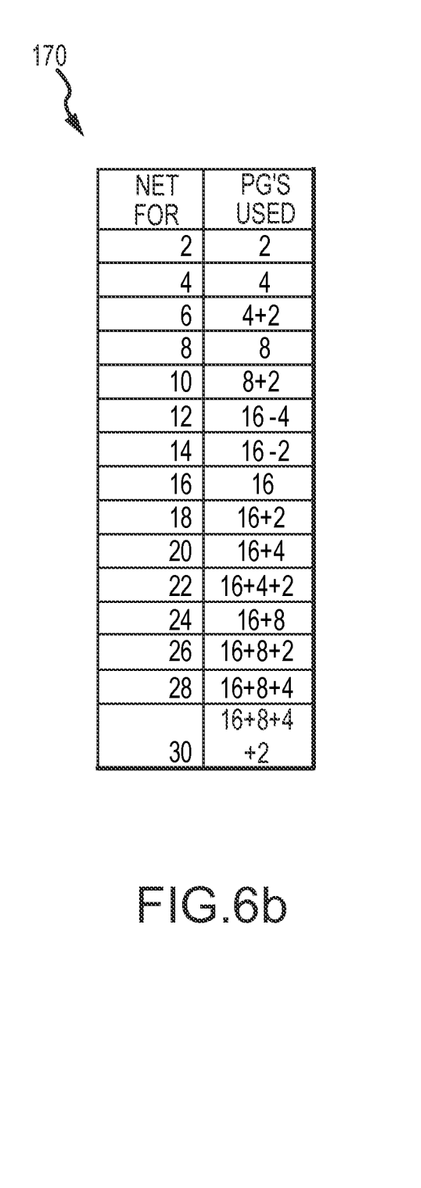

Referring now to FIGS. 6a and 6b, a number of PG stages (active or passive) are cascaded to provide discrete coarse steering. The diffraction angle of the first stage determines the resolution of the coarse steering.

In an embodiment depicted in FIG. 6a, the amplifier has an acceptance angle of ±0.5° both in-plane and out-of-plane. The LCWG provides continuous steering over the amplifier's acceptance angle of ±0.5°. A binary stack 160 has 4 polarization gratings (where each PG is an active or passive stage) per axis (total of 8) with discrete states of ±0.5, ±1.0, ±2.0 and ±4.0. The first PG has the same steering range as the waveguide for the transmitter to project a beam at 0°. For a waveguide with a range of ±0.5° the first grating would be ±0.5°. Setting the grating at +0.5° supports projecting the beam from 0 to 1°. Setting the grating at −0.5° supports projecting the beam from −1° to 0°. To steer 8°, the waveguide would be +0.5°, the first grating would be 0.5°, the second grating would be 1.0°, the third grating 2.0°, and the fourth grating 4.0° (0.5+0.5+1.0+2.0+4.0=8). The transmitter is capable of steering a high-power spot beam over a FOR of ±8° with a resolution limited by the LCWG. In one embodiment, the LCWG steering control resolution is 1 mV (on a 0 to 10V scale), which provides steering resolution of approximately 17 micro radians.

In another embodiment, the amplifier has an acceptance angle of ±2.0° both in-plane and out-of-plane. The LCWG provides continuous steering over ±2.0°. A binary stack 170 has 4 polarization gratings per axis (total of 8) with discrete states of ±2.0°, ±4.0°, ±8.0° and ±16.0. The first PG needs to have the same steering as the waveguide for the configuration to project a beam at 0°. For a waveguide with a range of ±2.0° the first grating would be +2.0. Setting the grating at +2.0° supports projecting the beam from 0 to 4°. Setting the grating at −2.0° supports projecting the beam from −4° to 0°). To steer 30°, the waveguide would be +2.0°, the first grating would be 2.0°, the second grating would be 4.0, the third grating 8.0, the fourth grating 16.0 (2.0+2.0+4.0+8.0+16.0=32). The transmitter is capable of steering a high-power spot beam over a FOR of ±32° with a resolution of approximately 17 micro radians.

In another embodiment, the amplifier acceptance angles are not equal, ±2.0° in-plane and ±1.0° out-of-plane. The LCWG provides continuous steering over ±2.0° in-plane and 1.0° out-of-plane. A stack has 4 polarization gratings in the in-plane axis with discrete states of ±2.0°, ±4.0°, ±8.0° and ±16.0° and 5 polarization gratings in the out-of-plane axis with discrete states of ±1.0°, ±2.0°, ±4.0°, ±8.0° and ±16.0° for a total of 9. The first PG in each axis needs to have the same steering as the waveguide for the configuration to project a beam at 0°. The transmitter is capable of steering a high-power spot beam over a FOR of ±32° with a resolution of approximately 17 micro radians.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A non-mechanically steered laser transmitter, comprising:
   a laser configured to produce a linearly polarized spot-beam along an optical axis;
   a liquid crystal waveguide (LCWG) oriented along the optical axis responsive to command signals to continuously the steer the linearly polarized spot-beam about the optical axis in a fine angular range no greater than ±2°×±2°;
   an optical amplifier oriented along the optical axis, said amplifier providing substantially uniform gain over the fine angular range to amplify the spot-beam;
   a fixed quarter waveplate that converts the linearly polarized spot-beam to a circularly polarized spot-beam; and
   a stack of switchable polarization gratings (PGs) responsive to command signals to discretely steer the circularly polarized spot-beam about the optical axis in a coarse angular range of at least ±10°×±10°.

2. The non-mechanically steered laser transmitter of claim 1, wherein the optical amplifier provides at least 10 dB optical gain with a uniformity of better than 3 dB over the fine angular range of the LCWG with an electrical-to-optical efficiency of at least 0.5%.

3. The non-mechanically steered laser transmitter of claim 2, wherein the optical amplifier provides at least 20 dB optical gain.

4. The non-mechanically steered laser transmitter of claim 1, wherein the optical amplifier comprises a crystal having a rotationally symmetric conical taper about the optical axis from an entrance face to a larger exit face, wherein an angle of taper from the entrance face to the larger exit face defines an acceptance angle of the amplifier that constrains the fine angular range of the LCWG.

5. The non-mechanically steered laser transmitter of claim 4, wherein the exit face is chamfered, wherein the optical amplifier further comprises one or more pump lasers that inject a pump signal through the chamfered exit face of the crystal inwards in a zig-zag pattern.

6. The non-mechanically steered laser transmitter of claim 4, wherein an exterior surface of the crystal is coated or clad to confine the pump signal inside the crystal and to reduce effects of amplified spontaneous emission (ASE).

7. The non-mechanically steered laser transmitter of claim 4, wherein the entrance face is perpendicular to the optical axis and the exit face is tilted relative to the entrance face to anamorphically compress an in-plane portion of the beam to make the exit beam circular.

8. The non-mechanically steered laser transmitter of claim 1, wherein the fixed QWP is a zero order waveplate.

9. The non-mechanically steered laser transmitter of claim 1, wherein each switchable PG comprises an active half waveplate and a grating.

10. The non-mechanically steered laser transmitter of claim 1, wherein the fine angular range is no greater than ±1°×±1°.

11. The non-mechanically steered laser transmitter of claim 1, wherein the LCWG steers the spot beam at least 1° per micro second.

12. The non-mechanically steered laser transmitter of claim 1, wherein the laser is configured to produce the spot beam at a wavelength of approximately 1.55 microns, wherein the amplifier is doped with Erbium.

13. A non-mechanically steered laser transmitter, comprising:
   a laser configured to produce a linearly polarized spot-beam along an optical axis;
   a liquid crystal waveguide (LCWG) oriented along the optical axis responsive to command signals to continuously steer the linearly polarized spot-beam about the optical axis in a fine angular range no greater than ±2°×±2° at at least 1° per micro second;
   an optical amplifier oriented along the optical axis, said amplifier comprising a crystal having a rotationally symmetric conical taper about the optical axis from an entrance face to a larger exit face, wherein an angle of taper from the entrance face to the larger exit face defines an acceptance angle of the amplifier that constrains the fine angular range of the LCWG, said amplifier providing substantially uniform gain over its acceptance angle to amplify the spot-beam;
   a fixed zero-order quarter waveplate that converts the linearly polarized spot-beam to a circularly polarized spot-beam; and
   a stack of switchable polarization gratings (PGs) responsive to command signals to discretely steer the circularly polarized spot-beam about the optical axis in a coarse angular range of at least ±10°×±10°.

14. The non-mechanically steered laser transmitter of claim 13, wherein the optical amplifier provides at least 10 dB optical gain with a uniformity of better than 3 dB over the fine angular range of the LCWG with an electrical-to-optical efficiency of at least 0.5%.

15. The non-mechanically steered laser transmitter of claim 13, wherein the optical amplifier further comprises one or more pump lasers that inject a pump signal from the exit face of the crystal inwards in a zig-zag pattern.

16. The non-mechanically steered laser transmitter of claim 13, wherein an exterior surface of the crystal is coated or clad to confine the pump signal inside the crystal and to reduce effects of amplified spontaneous emission (ASE).

17. A non-mechanically steered laser transmitter, comprising:
   a laser configured to produce a linearly polarized spot-beam at a wavelength of approximately 1.55 microns along an optical axis;
   a liquid crystal waveguide (LCWG) oriented along the optical axis responsive to command signals to continuously steer the linearly polarized spot-beam about the optical axis in a fine angular range no greater than ±2°×±2°;
   an Er-doped optical amplifier oriented along the optical axis, said amplifier providing at least 10 dB of optical gain with a uniformity of better than 3 dB over the fine angular range of the LCWG with an electrical-to-optical efficiency of at least 0.5% to amplify the spot-beam;
   a fixed quarter waveplate that converts the linearly polarized spot-beam to a circularly polarized spot-beam; and
   a stack of switchable polarization gratings (PGs) responsive to command signals to discretely steer the circularly polarized spot-beam about the optical axis in a coarse angular range of at least ±10°×±10°.

18. The non-mechanically steered laser transmitter of claim 17, wherein the optical amplifier comprises a crystal having a rotationally symmetric conical taper about the optical axis from an entrance face to a larger exit face, wherein an angle of taper from the entrance face to the larger exit face defines an acceptance angle of the amplifier that constrains the fine angular range of the LCWG.

19. The non-mechanically steered laser transmitter of claim 17, wherein the fixed QWP is a zero order waveplate.

20. The non-mechanically steered laser transmitter of claim 17, wherein the LCWG steers the spot beam at least 1° per micro second.

* * * * *